Figure 1:
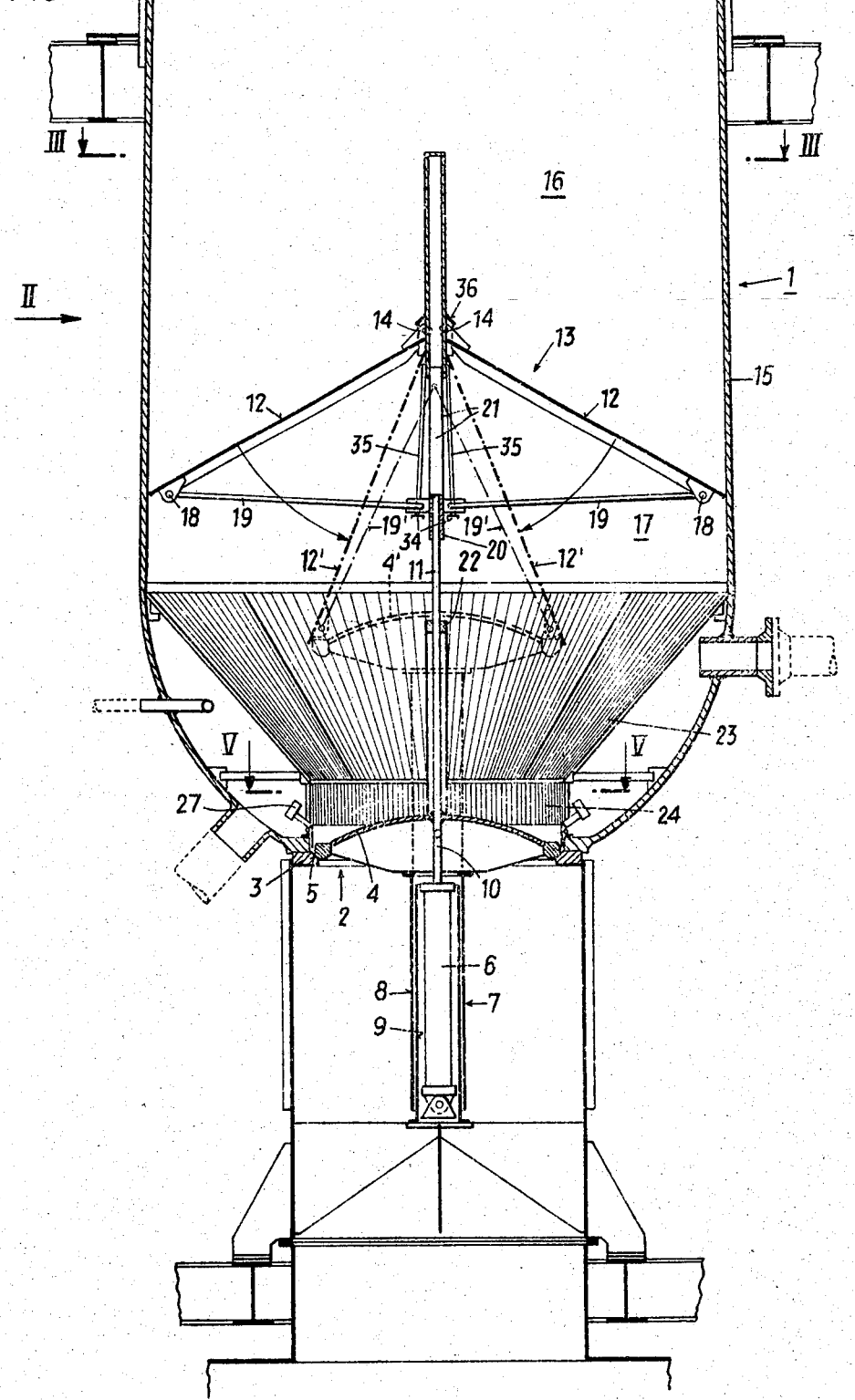

United States Patent [19]

Stadler et al.

[11] Patent Number: 4,607,767
[45] Date of Patent: Aug. 26, 1986

[54] CLOSURE DEVICE FOR THE DISCHARGE OPENING OF AN AUTOCLAVE

[75] Inventors: Johann Stadler, Hellmonsödt; Hildegard Schwarz, St. Georgen, both of Austria

[73] Assignee: Voest-Alpine Aktiengesellschaft, Vienna, Austria

[21] Appl. No.: 590,060

[22] Filed: Mar. 15, 1984

[30] Foreign Application Priority Data

Mar. 18, 1983 [AT] Austria .................................. 967/83

[51] Int. Cl.$^4$ ............................................. B67D 3/00
[52] U.S. Cl. .................................... 222/504; 222/508; 137/614.11
[58] Field of Search ............... 222/544, 509, 505, 559, 222/508, 506, 501, 504, 547, 564, 556, 545; 251/210, 118, 121, 123, 144; 137/614.11; 105/284, 287, 288, 289, 306

[56] References Cited

U.S. PATENT DOCUMENTS

| 271,700 | 2/1883 | Garstang | 222/506 |
| 2,166,484 | 7/1939 | Carlson | 222/504 |
| 2,611,465 | 9/1952 | Simon | 222/504 |
| 3,128,915 | 4/1964 | Matter | 222/501 |
| 3,223,113 | 12/1965 | Hopper | 222/504 |
| 4,120,409 | 10/1978 | Werff | 222/504 |

FOREIGN PATENT DOCUMENTS 2657636 6/1978 Fed. Rep. of Germany ...... 222/504

Primary Examiner—Joseph J. Rolla
Assistant Examiner—Kenneth Noland
Attorney, Agent, or Firm—Cushman, Darby & Cushman

[57] ABSTRACT

In an autoclave (1) which can be charged with bulk material and has at its bottom a discharge opening (2) to be closed by means of a cover (4), the cover (4) can be opened inward. For preventing that the bulk material obstructs the opening movement of the cover (4), a closure device (13) is provided to shut off the cross-section of the autoclave, said closure device being opened only after the cover (4) closing the discharge opening (2) has started its opening movement. The preceding closure device (13) comprises downwardly swivellable plates (12).

11 Claims, 9 Drawing Figures

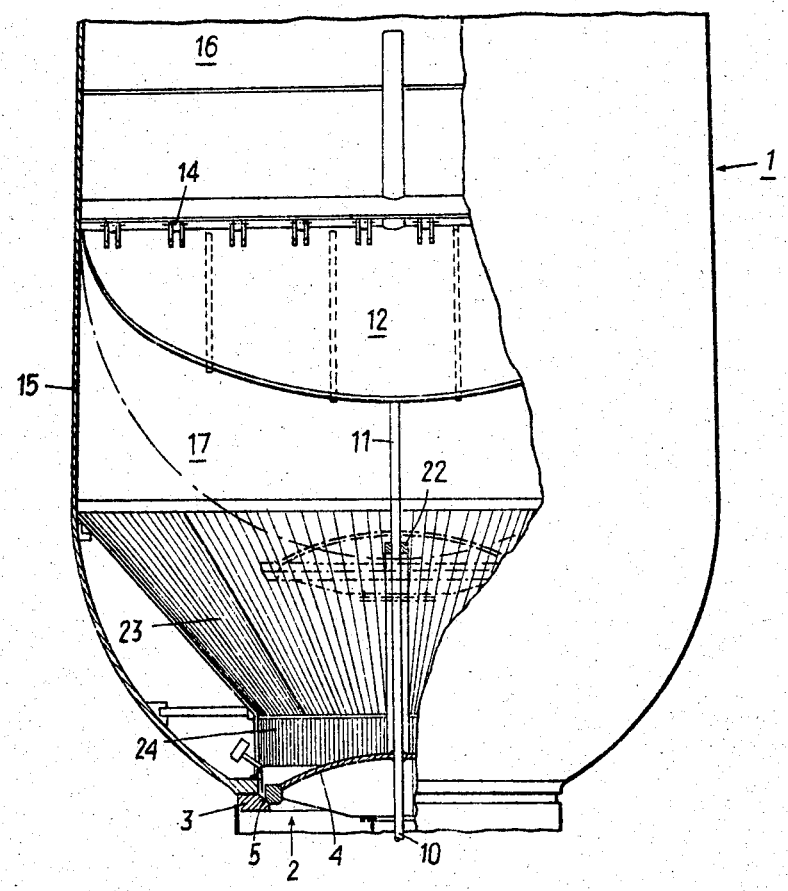
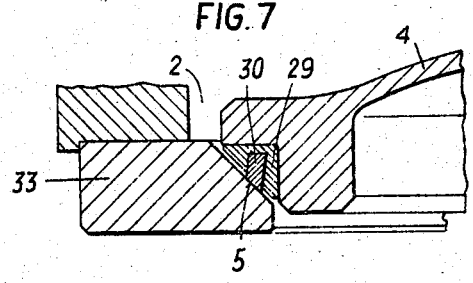
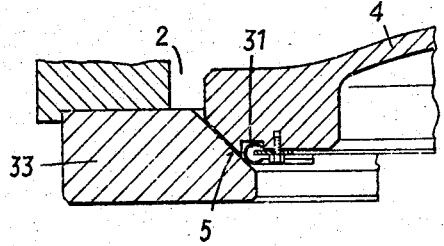
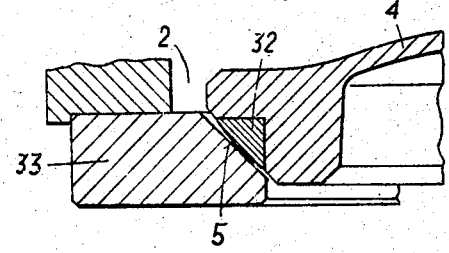

CLOSURE DEVICE FOR THE DISCHARGE OPENING OF AN AUTOCLAVE

The invention refers to a closure device for the discharge opening, closable by means of a cover, of an autoclave which can be charged with lumpy or grainy bulk material. Such autoclaves are used, for example, for drying coal or brown coal, respectively, by means of steam under pressure.

In known autoclaves of this type, the cover closing the discharge opening can be opened outward. This has the drawback that the cover is loaded in the opening sense by the internal pressure, so that it is difficult to maintain a tight seal. It has already been proposed to arrange the cover closing the charging opening of the autoclave so as to open inward, so that the cover is pressed against the tightening seat of the charging opening by the internal pressure. In the known autoclaves for treating lumpy material, opening of the cover closing the discharge opening is, however, not possible because the lumpy material rests on the cover.

It is an object of the invention to improve tightening of the discharge opening and to facilitate opening of the cover closing the discharge opening.

The invention essentially consists in that the discharge opening is preceded by a closure device arranged above the cover at a distance therefrom and adapted to shut off the cross-section of the autoclave and adapted to be opened, said closure device comprising two plates adapted to be swivelled around axes transversely extending through the free cross-section of the autoclave and including, in closed position, one with the other, an angle open in the downward direction and diminished in open position of the closure device, and that the cover can be opened inward and in the direction towards the closure device and extends over the edge of the discharge opening in closed position, noting that opening movement of the closure device is only effected if the cover is at least partially opened. The space above the cover closing the discharge opening is at least partially kept free of lumpy bulk material by means of the closure device, so that inward opening movement of the cover is easily made possible. On account of the cover opening in inward direction and extending over the edge of the discharge opening, there results the advantage that the cover is forced into sealing position by the internal pressure within the autoclave. Constructional parts for maintaining the cover in closed position against the action of the internal pressure can thus be omitted. The greater the internal pressure is within the autoclave and thus the greater the sealing difficulties are, the higher is the force which forces the cover against the sealing. Because the opening movement of the closure device is only effected if the cover is at least partially opened, it is made sure that the opening movement of the cover is not obstructed by the bulk material. Because the plates include, in their closed position, an angle open in the downward direction, i.e. towards the bottom, and becoming diminished during opening movement, and because the plates are thus swivelled downward during opening movement, opening movement of the preceding closure device is not obstructed, but facilitated by the bulk material resting on the plates. According to a preferred feature of the invention, the drive means for the closure device is coupled with the drive means of the cover in a time-delayed fashion, so that the sequence of the opening movements is automatically determined.

According to the invention, the axes around which the plates can be swivelled extend approximately along a diameter of the free cross-section of the autoclave, the plates having the shape of half of an ellipse. In closed position, these plates are inclined like a roof. With a circular free cross-section of the autoclave, there results for the plates the shape of halves of the surface area of an ellipse. During opening movement, the plates are folded together in the downward direction, the preceding closure device thus releasing the passage of the bulk material through the discharge opening.

According to a preferred embodiment of the invention, strutting bars arranged below the plates are pivotally linked to the plates. The plates are brought into closed position by means of these strutting bars and maintained in closed position against the weight of the bulk material resting on the plates. As soon as the strutting bars are no longer supported, the plates of the preceding closure device are folded downward and allow the passage of the bulk material through the discharge opening. According to a preferred embodiment of the invention, the strutting bars are pivotally linked to a bushing arranged on a central rod, said bushing being connected with the cover and with a component part of a thrust piston drive means and being arranged for being shifted between two limit stops fixed on the central rod in an axial distance one from the other, the lower limit stop engaging the bushing after a predetermined opening path of the cover and effecting sudden opening movement of the preceding closure device, while the upper limit stop initiates the closing movement of the preceding closure device and defines its closed position. It is thus achieved that the preceding closure device automatically opens in the correct time sequence after having opened the cover. It is only required to adjust the position of the limit stops on the central rod in such a way that the lower limit stop acts on the bushing only after the cover has covered a certain path of opening movement or has even been completely opened, noting that the upper limit stop is to be adjusted in such a way that by engaging the bushing, it moves the bushing into a position in which the preceding closure device is closed when the cover assumes its closed position.

According to the invention, the arrangement is preferably such that in the closed position of the closure device, the bushing has been brought by the upper limit stop into a position in which the strutting bars are pressed downward beyond their stretched position and that the bushing and the strutting bars are supported against any further downward movement by at least one stop connected to a component part fixed to the body of the autoclave. It is thus achieved that, by the force exerted by the plates, the strutting bars are maintained in that position in which they maintain the plates in closed position. Only when the cover has been opened to such an extent that the lower limit stop arranged on the central rod pushes the bushing upward are the strutting bars moved upward beyond their stretched position. The force exerted by the plates on the strutting bars now acts in such a way that the strutting bars are folded together, so that with the cover having been lifted for a correspondingly long path, the preceding closure device is suddenly opened. By such a sudden opening movement, any damaging of the sealing surfaces of the cover by the bulk material is avoided.

The cover now assumes a position above that area in which the bulk material falls down, and it is thus also avoided that the cover is loaded by the bulk material falling down.

According to the invention, the closure device can be provided with perforations allowing the passage of steam and optionally of smaller particles of the lumpy material. When treating the charged material with steam, the openings allowing passage of the steam prevent that the closure device is subjected to pressure load by the steam. If the openings have a size sufficient also to allow passage of smaller particles of the lumpy material into the space below the closure device, the space between the closure device and the cover can also, with the cover assuming closed position, partially be used as treating space, noting that the perforations must be so small in size that not too much lumpy material falls through them, in which case opening movement of the cover could be obstructed.

Preferably and according to the invention, an insert member formed of sheet metal, grate rods or the like is provided below the preceding closure device and is conically tapered from the wall of the autoclave in the direction towards the discharge opening. The charge material is thus directed to the discharge opening as soon as the preceding closure device and also the cover have been opened. According to the invention, protecting plates can be arranged around the discharge opening for being swivelled around approximately horizontal axes, which protecting plates contact, in open position of the cover, the sealing surfaces of the cover under the action of weight load or spring load and are pushed outward by the cover during the closing movement of the cover. Thus the sealing surfaces of the cylindrical edge of the discharge opening are protected and prevented from becoming damaged by the lumpy bulk material during discharge thereof.

According to a further preferred embodiment of the invention, the thrust piston drive means is arranged below the discharge opening and coaxially therewith and the piston of the thrust piston drive means is surrounded by a stationary tube telescopically cooperating with a tube fixed to the cover, the piston of the thrust piston drive means being connected with the central rod. This provides a favourable arrangement of the thrust piston drive means in which the thrust piston drive means acts axially on the cover and the closure device, the thrust piston drive means thus being protected against any damage by the bulk material discharged.

In the drawing, the invention is schematically illustrated with reference to an embodiment.

Figure 3:
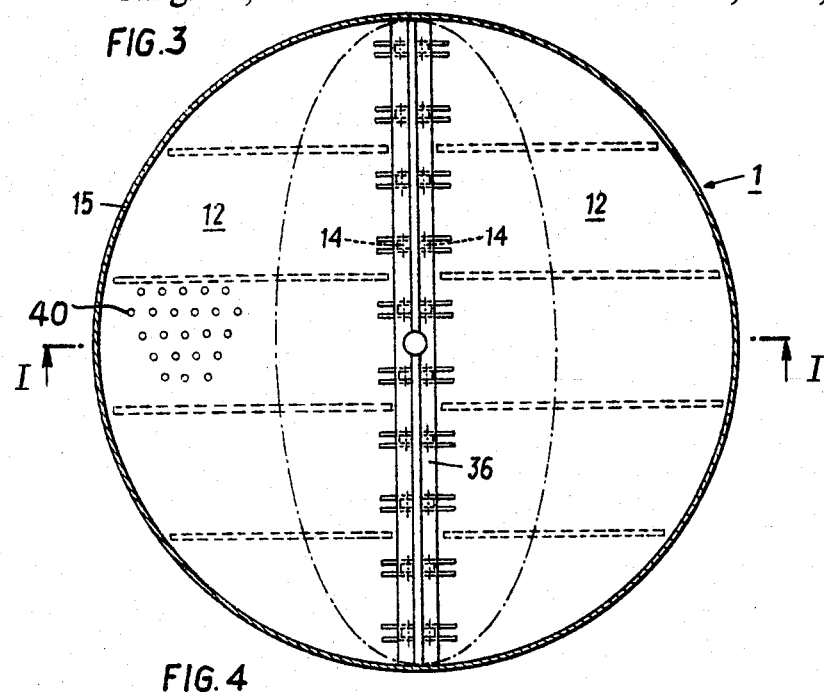

FIGS. 1, 2 and 3 show the discharge end of the autoclave,

FIG. 1 representing a section along line I—I of FIG. 3,

FIG. 2 showing a view in the direction of the arrow II of FIG. 1 with partially cut wall of the autoclave, and FIG. 3 showing a section along the line III—III of FIG. 1.

Figure 4:
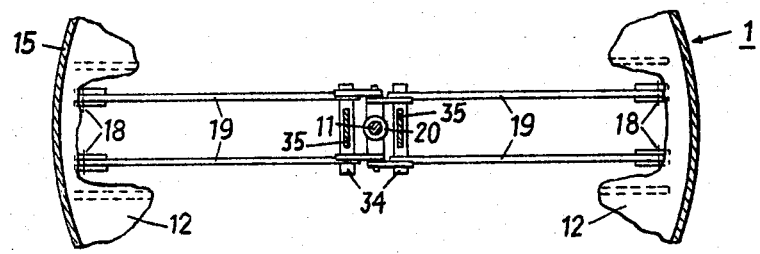

FIG. 4 shows the strutting bars in a cross-section through the autoclave.

Figure 5:
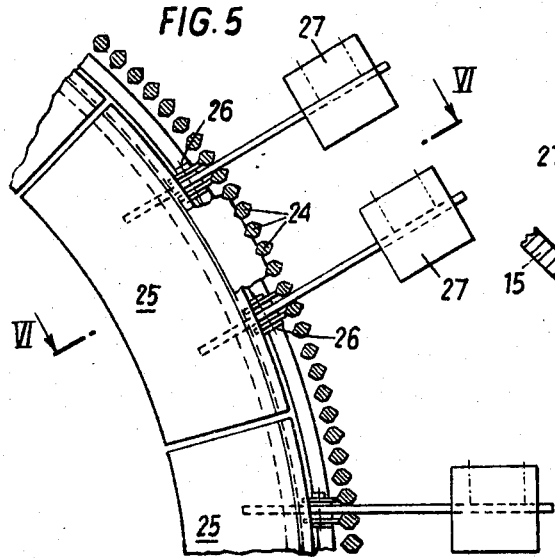
Figure 6:
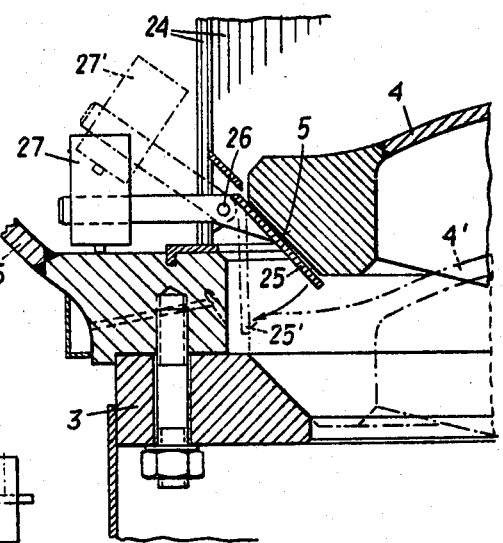

FIGS. 5 and 6 each show a detail, FIG. 5 showing a partial section along line V—V of FIG. 1 and FIG. 6 showing a section along line VI—VI of FIG. 5.

FIGS. 7, 8 and 9 show various embodiments of the sealing in a section through the cover and the edge of the discharge opening of the autoclave.

The autoclave 1 has a discharge opening 2 at its bottom end. The edge of the discharge opening is designated by 3. 4 is the cover, being seated on the edge 3 of the discharge opening 2 by means of a conical sealing surface 5 and being adapted to be opened inward. 6 is the cylinder of a thrust piston drive means 7. The piston 6 is surrounded by a telescopic tube 8, 9, the inner tube 9 being stationarily arranged and the outer tube 8 being connected with the cover 4. A central rod 11 fixed to the cover 4 is linked to the piston rod 10 of the thrust piston drive means 7.

A closure device 13 formed of two plates 12 of approximately the shape of a semicircle is arranged above the cover 4. Both said plates 12 are pivotally connected with one another to be swivelled around axes 14 stationarily bearing-supported within the autoclave 1. In the drawing, these plates 12 are shown in their closed position, in which they contact with their edge the wall 15 of the autoclave. Within the space 16 located above the closure device 13, there is located the bulk material to be treated, which to a great extent is prevented from entering the space 17 between the cover 4 and the closure device 13. Strutting bars 19 are pivotally linked at 18 to the plates 12 and are pivotally linked at their other ends to a bushing 20. The central rod 11 has a limit stop 21, which in closed position of the cover 4 contacts the upper end of the bushing 20 and forces this bushing into a position in which the strutting bars 19 press the plates 12 against the wall 15. As is shown in the drawing, the strutting bars 19 in this position are pressed downward beyond their stretched position. In this position, the bushing 20 and the strutting bars 19 are supported on stops 34, which are connected, with interposition of flaps 35, with a component part, i.e. with the axes 14 of the autoclave. By means of these stops 34, the strutting bars 19 are maintained in their downwardly pressed position, in which they are blocked by the weight of the plates 12 and the weight of the coal resting thereon. When the cover is opened, the central rod 11 connected therewith is shifted upward. Following a predetermined path, a limit stop 22 fixed to the rod 11 engages the lower edge of the bushing 20 and shifts the bushing upward on further opening movement of the cover. As soon as the bushing passes upward beyond the pullout point (horizontal position of the strutting bars 19), the strutting bars are no longer supported and are folded together. Under the weight of the coal, the plates 12 are suddenly pressed downward and arrive at the position 12' shown in dashed-dotted lines, the strutting bars 19 arriving at the position 19' shown in dashed-dotted lines. The bulk material can now move in the direction towards the discharge opening 2, which has already been opened by lifting the cover 4. The lower limit stop is arranged on the central rod 11 in such a position that it hits the sliding bushing 20 only when the cover 4 has already covered a considerable portion of its opening stroke or has nearly completely been opened. As soon as the strutting bars 19 have arrived at their upper position located beyond their horizontal position, the intrinsic weight of the plate and the coal resting thereon causes folding of both plates 12. This folding of the plates is a sudden movement and reliably warrants starting of downward movement of the coal charged. In its open position, the cover 4 assumes the position 4', in which the cover can no longer be hit by the falling coal, so that the sealing surfaces of the cover are protected.

Below the closure device 13 there is provided an insert member 23 formed of sheet metal or grate rods, the upper edge of said insert member 23 contacting the wall 15 of the autoclave 1 and said insert member tapering downward towards the discharge opening 2. This insert member 23 directs the bulk material towards the discharge opening.

The closure device can be provided with perforations 40 as shown in FIG. 3. When treating the charged material with steam the perforations allow steam to pass through to prevent pressure from building up against the closure device. The perforations may be of sufficient size to allow smaller particles of material to pass into the space below the closure device.

The lower end of this insert member 23 passes over into a cylindrical insert member 24, which is formed of grate rods. As is shown in FIGS. 5 and 6, metal sheets 25 are arranged around the discharge opening 2 so as to be swivelled around stationary axes 26. Said metal sheets are maintained in the position shown in FIG. 6 by means of counterweights 27 and in this position contact the sealing surface 28 of the opened cover 4, and thus protect this sealing surface. When the cover 4 is lowered from the opened position shown in full lines into the closed position 4' shown in dashed lines, the metal sheets 25 are displaced by the cover and now assume the position 25' shown in dashed lines, while the counterweights 27 arrive at position 27' shown in dashed lines.

FIGS. 7, 8 and 9 show various types of sealing surfaces 5 of the cover 4. The sealing surface can, as is shown in FIG. 7, be formed of a sealing fabric 30 inserted in an insert member 29. As is shown in FIG. 8, the sealing can be formed of a metallic C-ring 31. FIG. 9 shows an arrangement in which the sealing is formed of a metallic insert member 32. The sealing surfaces of the discharge opening 2 are arranged on a ring 33. The ring 33 and the component parts 29, 31 and 32 of the sealing of the cover 4 can easily be interchanged.

What is claimed is:

1. A closure device for a discharge opening of an autoclave including a reciprocable cover member capable of sealing the discharge opening, the cover being arranged such that the cover is raised vertically into the autoclave during an opening phase, the closure device comprising a pair of plate members hingedly connected together and capable of closing the autoclave when extended outwardly and upwardly to a closing position and capable of opening the autoclave when swung downwardly and inwardly. to an opening position, said hinged connection being disposed transverse to the autoclave, the closure member further including a pair of strutting bars each pivotally connected to one plate member and a bushing, a rod attached to the cover and extending through said bushing, the rod having a first stop positioned between the bushing and the cover and a second stop spaced from the first stop opposite the bushing such that an upward opening movement of the cover brings the first stop into engagement with the bushing to move said plate members to their opening position and such that a downward movement of the cover u causes engagement of the second stop with the bushing to move said plate members to their closing position.

2. Closure device as claimed in claim 1, characterized in that a drive means for the closure device is coupled with a drive means of the cover.

3. Closure device as claimed in claim 1, characterized in that the axes around which the plates can be swivelled ettend approximately along a diameter of the free cross-section of the autoclave, the plates having the shape of half of an ellipse.

4. Closure device as claimed in claim 1, characterized in that strutting bars arranged below the plates are pivotally linked to the plates.

5. Closure device as claimed in claim 1, characterized in that in the closed position of the closure device, the bushing has been brought by the upper limit stop into a position in which the strutting bars are pressed downward beyond their stretched position and in that the bushing and the strutting bars are supported against any further downward movement by at least one stop connected to a component part fixed to the body of the autoclave.

6. Closure device as claimed in claim 1, characterized in that the device is provided with perforations allowing the passage of steam and smaller particles of material.

7. Closure device as claimed in claim 1, characterized in that an insert member formed of sheet metal, grate rods or the like is provided below the closure device and is conically tapered from the wall of the autoclave in the direction towards the discharge opening.

8. Closure device as claimed in claim 1, characterized in that protecting plates are arranged around the discharge opening for being swivelled around approximately horizontal axes, which protecting plates contact, in open position of the cover, the sealing surfaces of the cover under the action of weight load or spring load and are pushed outward by the cover during the closing movement of the cover.

9. Closure device as claimed in claim 1, characterized in that a thrust piston drive means is arranged below the discharge opening and coaxially therewith and the piston of the thrust piston drive means is surrounded by a stationary tube telescopically cooperating with a second tube fixed to the cover, the piston of the thrust piston drive means being connected with the central rod.

10. A closure device for a discharge opening at the bottom of an autoclave including a reciprocable cover member capable of sealing the opening, the cover being arranged such that during opening the cover is raised into the autocalve, the closure device being positioned vertically above the cover and comprises a pair of plate members pivotally connected to each other and capable of closing the autoclave above said cover, the cover being connected to the closure member by a means such that the cover member opens before the closure member begins to open, the device further comprising a plurality of protecting plates arranged around the discharge opening and capable of pivoting about a horizontal axis, the protecting plates capable of contacting sealing surfaces of the cover in the open position of the cover, the protecting plates further being pushed outwardly by the cover member during closing of the cover member.

11. A closure device for a discharge opening at the bottom of an autoclave including a reciprocable cover member capable of sealing the discharge opening, the cover being arranged such that during opening the cover is raised into the autoclave, the closure member being opositioned vertically above the cover and comprises a pair of plate members pivotally connected to each other and capable of closing the autoclave above said cover, the pivotal connection of the palte members being disposed transversally to the autoclave, the cover member including a drive means to raise and lower the cover, an actuating rod including a linkage means extending from the cover to the closure device and whereby the closure member opens after the cover member is opened and lowering the cover member closes the closure member.

* * * * *